United States Patent [19]

St. Clair et al.

[11] 4,151,057
[45] Apr. 24, 1979

[54] HIGH TEMPERATURE ADHESIVE MADE BY EXPOSURE TO RADIATION

[75] Inventors: David J. St. Clair; David R. Hansen, both of Houston, Tex.

[73] Assignee: Shell Oil Company, Houston, Tex.

[21] Appl. No.: 933,218

[22] Filed: Aug. 14, 1978

[51] Int. Cl.$^2$ .............................................. C08F 8/00
[52] U.S. Cl. ......................... 204/159.17; 204/159.14; 204/159.2; 260/27 BB; 260/33.6 UA; 260/876 B; 428/461; 428/483; 428/508
[58] Field of Search ................ 260/876 B; 204/159.2, 204/159.14, 159.17

[56] References Cited

U.S. PATENT DOCUMENTS

| | | | |
|---|---|---|---|
| 3,113,912 | 12/1963 | Kraus | 204/159.2 |
| 3,860,505 | 1/1975 | Tarney et al. | 204/159.12 |
| 3,936,365 | 2/1976 | Saunders et al. | 204/159.2 |
| 4,006,024 | 2/1977 | Ibatu et al. | 96/115 R |
| 4,076,768 | 2/1978 | Saunders et al. | 260/876 B |
| 4,127,461 | 11/1978 | Paulen | 204/159.14 |

*Primary Examiner*—Richard B. Turer
*Attorney, Agent, or Firm*—Dean F. Vance

[57] ABSTRACT

A cured adhesive composition possessing excellent cohesive strength at high temperatures along with excellent shear strength and solvent resistance is prepared by the electron beam initiated curing of an adhesive composition comprising selectively hydrogenated monoalkenyl arene/conjugated diene block copolymer component, tackifying resin and a di-to-tetra-functional acrylate or methacrylate selected from the group consisting of acrylic and methacrylic acid esters of polyols.

11 Claims, No Drawings

HIGH TEMPERATURE ADHESIVE MADE BY EXPOSURE TO RADIATION

BACKGROUND OF THE INVENTION

Styrene-diene block copolymers have been formulated in the past to produce a number of types of adhesive compositions. The basic patent in this field, Harlan, U.S. Pat. No. 3,239,478, shows combinations of these block copolymers with tackifying resins and paraffinic extending oils to produce a wide spectrum of adhesives. However, three serious limitations of these adhesive compositions are their relatively low service temperatures, poor ultraviolet (UV) resistance and their poor solvent resistance. Generally, the highest temperature at which these styrene-diene block copolymers retain useful properties and act like a vulcanized rubber is limited by the softening temperature (Tg) of the styrene end block. Depending upon the molecular weight of the end blocks and the load, these block copolymers can begin to significantly creep or flow at 120°–180° F. Although these adhesives can withstand very short contact with common solvents, prolonged contact with aromatic solvents or blends containing aromatic, ester or lactone solvent will cause these adhesives to soften and lose cohesive strength. For a number of applications it would also be very advantageous to have higher service temperatures. For example, these adhesives would be useful in paint shops if the masking tapes produced had solvent resistance and a 225°–250° F. service temperature. They would also be useful as laminating adhesives in, for example, retortable food pouches if they could withstand boiling water temperatures and in furniture laminating adhesives if they could bear moderate loads at 250° F.

One means to improve the service temperature of these styrene-diene block copolymer adhesive compositions is to chemically cure the adhesive with a phenol formaldehyde resin and heat as disclosed in Korpman, U.S. Pat. No. 3,625,752. However, this procedure is undesirable because it is a very energy intensive process to heat the adhesive after it has been applied to the backing. Also, this process cannot be used on heat sensitive backing such as plastics because the backing melts at the temperatures required to cure the adhesive. A more energy efficient process is the radiation initiated cure disclosed in Hendricks, U.S. Pat. No. 2,956,904. Compositions disclosed, however, did not contain a supplemental crosslink promoting ingredient and therefore, as will be shown here, do not give adequate results.

A new adhesive composition that can be easily cured has now been found.

CROSS REFERENCE TO COPENDING APPLICATIONS

The present invention is related to the invention disclosed in the copending patent application, Ser. No. 883,118, filed on Mar. 3, 1978 now U.S. Pat. No. 4,133,731, entitled High Temperature Adhesive Composition, and having the same inventors and same assignee.

SUMMARY OF THE INVENTION

The present invention broadly encompasses a cured adhesive composition possessing excellent high temperature cohesive strength along with excellent shear strength, UV resistance and solvent resistance. The adhesive is prepared by the electron beam initiated curing of an adhesive composition comprising:

(a) 100 parts by weight of a block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks;

(b) about 25 to about 250 parts by weight of an adhesion-promoting resin compatible with block B; and (c) about 1 to about 100 parts by weight of a di-to-tetra-functional acrylate or methacrylate selected from the group consisting of the acrylic and methacrylic acid esters of polyols.

Additional components may be present in the composition including, among others, plasticizers such as rubber compounding oils or liquid resins, antioxidants, and end block (A or A') compatible resins.

DETAILED DESCRIPTION OF THE INVENTION

The term "block copolymer component" comprises the combination of a multiblock copolymer, as hereinafter defined, and an A'B' two block copolymer. The weight ratio of the multiblock copolymer to the A'B' two block copolymer is about 100:0 to about 10:90, preferably about 80:20 to about 40:60.

The multiblock copolymers employed in the present invention may have a variety of geometrical structures, since the invention does not depend on any specific geometrical structure, but rather upon the chemical constitution of each of the polymer blocks. Thus, the structures may be linear, radial or branched so long as each multiblock copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with coupling agents such as mono or dihaloalkanes or -alkenes and divinyl benzenes as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)

polystyrene-polyisoprene-polystyrene (SIS)
poly(alpha-methylstyrene)-polybutadiene-poly(alphamethylstyrene) and
poly(alpha-methylstyrene)-polyisoprene-poly(alphamethylstyrene)

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 6,000–60,000 while the conjugated diene blocks either before or after hydrogenation will have average molecular weights in the order of 10,000–300,000, preferably 30,000–150,000. The total average molecular weight of the multiblock copolymer is typically in the order of 25,000 to about 350,000, preferably from about 35,000 to about 300,000. These molecular weights are most accurately determined by tritium counting methods or osmotic pressure measurements.

The proportion of the monoalkenyl arene blocks should be between about 8 and 65% by weight of the multiblock copolymer, preferably between about 10 and 30% by weight.

The chemical composition and molecular weight ranges of the A' and B' blocks of the A'B' two block copolymer are the same as the A and B blocks of the multiblock copolymer. The A'B' two block copolymer may be prepared in a separate synthesis process or may be prepared along with the multiblock copolymer by controlling coupling efficiency. The control of coupling efficiency is disclosed in U.S. Pat. No. 4,096,203. The A'B' two block copolymer is useful in reducing the overall viscosity of the adhesive composition along with improving the tack.

The block copolymer component by itself lacks the required adhesion. Therefore, it is necessary to add an adhesion promoting or tackifying resin that is compatible with the elastomeric conjugated diene block. A common tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl-2-butene and about 10% dimer. See U.S. Pat. No. 3,577,398. Other tackifying resins of the same general type may be employed in which the resinous copolymer comprises 20–80 weight percent of piperylene and 80-20 weight percent of 2-methyl-2-butene. The resins normally have softening points (ring and ball) between about 80° C. and about 115° C. Other adhesion promoting resins which are also useful in the compositions of this invention include hydrogenated resins, esters of rosins, polyterpenes, terpenephenol resins, and polymerized mixed olefins. For best UV resistance, it is preferred that the tackifying resin be a saturated resin, e.g. a hydrogenated resin such as Escorez 5380 resin made by EXXON.

The amount of adhesion promoting resin employed varies from about 25 to about 200 parts by weight per hundred parts rubber (phr), preferably between about 50 to about 150 phr.

The adhesive compositions of the instant invention also may contain plasticizers such as rubber extending or compounding oils or liquid resins. These rubber compounding oils are well-known in the art and include both high saturates content and high aromatics content oils. The amount of rubber compounding oil employed varies from 0 to about 100 phr, preferably about 10 to about 60 phr.

Optionally, an arene-block-compatible resin may be employed. Compatibility is judged by the method disclosed in U.S. Pat. No. 3,917,607. Normally, the resin should have a softening point above about 100° C., as determined by ASTM method E 28, using a ring and ball apparatus. Mixtures of arene-block-compatible resins having high and low softening points may also be used. Useful resins include coumarone-indene resins, polystyrene resins, vinyl toluene-alphamethylstyrene copolymers, and polyindene resins. Much preferred is a coumarone-indene resin. The amount of arene-block-compatible resin varies from 0 to about 200 phr.

An essential component of the present invention is the di-to-tetra-functional acrylate or methacrylate coupling agent which promotes crosslinking of the block copolymer during exposure to the radiation. The coupling agents employed herein are di-, tri-, and tetrafunctional acrylates and methacrylates selected from the group consisting of the acrylic and methacrylic acid esters of polyols. Preferred coupling agents include 1,6-hexane diol diacrylate (HDODA), 1,6-hexane diol dimethacrylate (HDODM), trimethylolpropane triacrylate (TMPTA), trimethylolpropane trimethacrylate (TMPTM), pentaerythritol tetracrylate (PTA), and pentaerythritol tetramethacrylate (PTM). Other useful acrylates and methacrylates include pentaerythritol triacrylate, dipentaerythritol monohydroxy penta/acrylate, 1,3-butylene glycol diacrylate, 1,4-butene diol diacrylate, 2,2-dimethyl propane 1,3-diacrylate (neopentyl glycol diacrylate), diethylene glycol diacrylate, diallyl fumarate, allyl methacrylate, 1,3-butylene glycol dimethacrylate, ethylene glycol dimethacrylate, diethylene glycol dimethacrylate, treithylene glycol dimethacrylate, tetraethylene glycol dimethacrylate, polyethylene glycol dimethacrylate, and ethoxylated bisphenol A dimethacrylate. Much preferred coupling agents are TMPTA and TMPTM with TMPTM being the most preferred. The amount of coupling agent employed varies from about 1 phr to about 100 phr, preferably about 5 phr to about 25 phr.

The compositions of this invention may be modified with supplementary materials including pigments, fillers, and the like as well as stabilizers and oxidation inhibitors.

The adhesive compositions of the present invention may be applied to the substrate from a solution of up to about 40% weight solids of the ingredients in a solvent such as toluene, the solvent being removed by evaporation prior to crosslinking by exposure to the radiation. Alternatively, the ingredients may be mixed in a solvent, the mixture may be emulsified and the solvent evaporated, and the adhesive may be applied to the substrate as a 60–70% weight solids water-based emulsion, the water being removed by evaporation prior to crosslinking. Adhesives of the present invention are especially suited for preparation as 100% solids hot melt adhesives since they give adequate processing viscosities, and good pot live, up to several hours, at processing temperatures of about 150° C. A preferred method for processing these adhesives to minimize gel formation during hot melt processing is to use an extruder to mix the adhesive and feed the coating die as is disclosed in Korpman U.S. Pat. No. 3,984,509.

The compositions of the present invention are cured by exposure to high energy radiation such as electron beam radiation.

The electron beam radiation or high energy ionizing radiation which is employed to effect the crosslinking reaction can be obtained from any suitable source such as an atomic pile, a resonant transformer accelerator, a Van de Graaf electron accelerator, a Linac electron accelerator, a betatron, a synchrotron, a cyclotron, or the like. These sources will produce ionizing radiation such as electrons, protrons, neutrons, deuterons, gamma rays, X rays, alpha particles, and beta particles.

The crosslinking reaction is conveniently effected at room temperature, but it can be conducted at depressed or elevated temperatures if desired. It is also within the spirit and scope of the invention to effect the crosslinking reaction within the confines of an inert atmosphere to prevent oxidative degradation of the block copolymer.

The amount of radiation required depends primarily upon the type and concentration of acrylate or methacrylate employed and the level of curing desired. Suitable doses of electron beam radiation include 1 megarad to about 20 megarads, preferably about 2 megarads to about 10 megarads.

A preferred use of the present formulation is in the preparation of pressure-sensitive adhesive tapes or in the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes.

The invention is further illustrated by means of the following illustrative embodiments, which are given for the purpose of illustration only and are not meant to limit the invention to the particular reactants and amounts disclosed.

The high temperature cohesive strength of the irradiated adhesive compositions was measured by a Strippability Temperature Limit (STL) test. STL is defined as the maximum temperature at which a tape can be rapidly peeled from a hot, stainless steel substrate without leaving an adhesive residue on the panel. The test is run by applying a quarter inch wide strip of tape to a stainless steel panel whose temperature is controlled to give a temperature gradient of about 30° F. per inch between 100° F. and 450° F. Following a 30 second warmup, the tape is stripped off manually at high speed and at approximately a 90° angle. The equipment used is a Heizbank type 184321 melting point tester from the Reichert Company, Vienna, Austria. The temperature at which massive cohesive failure occurs is recorded as the STL value in all following tables. The STL test measures whether an automotive masking tape can be removed cleanly when it is stripped from a painted car as it leaves the paint baking ovens.

Gel refers to the appearance of the rubber in the adhesive after about one square inch of tape has soaked in toluene for about 24 hours. If the adhesive is not chemically crosslinked, it will dissolve and there will be no gel. If it is only lightly crosslinked, it will not completely dissolve and a rather loose gel structure will be found. If the adhesive is properly crosslinked the rubber will be tightly gelled. The thickness of the swollen gel can be used as a measure of the degree of crosslinking. In this respect, gel is rated as none (N), loose (L) or tight (T). The thickness, in mils, of the tightly crosslinked, swollen gel is given in parentheses following the rating of the gel as tight.

Holding power (HP) is defined as a time required for a $\frac{1}{2}'' \times \frac{1}{2}''$ area of tape adhered to steel to fall under a load of 2 kg applied in shear at a 2 degree antipeel. The method is Pressure Sensitive Tape Council Method #7.

In all embodiments, the adhesive composition was prepared in a toluene solution and applied as about a 1.5 mil dry adhesive layer to a 1 mil Mylar substrate. Electron beam irradiation was accomplished under a nitrogen blanket using an 18 inch wide ELECTROCURTAIN® PROCESSOR manufactured by Energy Sciences, Inc.

The adhesive compositions used in Illustrative Embodiments 1–4 are shown in parts by weight in Table I. The selectively hydrogenated multiblock polystyrene-polybutadiene-polystyrene was prepared by using a coupling agent and has molecular weights within the preferred range of the present invention. The two block copolymer constitutes the uncoupled polymer produced in the synthesis of the multiblock block. Accordingly, the A and A' block molecular weight is identical for both the multiblock and two block copolymers while the B block of the multiblock copolymer has a molecular weight twice the size of the B' block of the two block copolymer. The tackifying resin employed was Escorez 5380 resin which is a hydrogenated synthetic hydrocarbon resin. Butazate or butyl zimate is employed as an antioxidant. The crosslinking agent employed was trimethylolpropane trimethacrylate.

Table I

| Formulation Number | 1 | 2 | 3 | 4 |
|---|---|---|---|---|
| Multiblock Copolymer (S-EB-S) | 93 | 93 | 93 | 93 |
| Two block Copolymer (S-½EB) | 7 | 7 | 7 | 7 |
| Tackifying resin | 80 | 80 | 80 | 80 |
| Butazate | 2 | 2 | 2 | 2 |
| TMPTM | 0 | 3 | 10 | 25 |

The test results are presented below in Table II.

Table II

| Radiation Dose, Mrad | Property | 1 | 2 | 3 | 4 |
|---|---|---|---|---|---|
| 0 | STL | 315 | | | |
|   | HP | >4000 | | | |
| 2 | STL | | | | 335 |
|   | Gel | N | N | N | L |
| 5 | Initial STL | | | 310S | 315D |
|   | STL | 300 | 310 | 340 | >400 |
|   | Gel | N | N | N | T(8) |
|   | HP | | | | >4000 |
| 10 | Initial STL | | | 290D | 340D |
|   | STL | 280 | 300 | >400 | >400 |
|   | Gel | N | N | T(13) | T(7) |
|   | HP | | | >4000 | >4000 |

What is claimed is:

1. An adhesive composition possessing excellent UV stability and high temperature cohesive strength prepared by the electron beam curing of an adhesive composition, said adhesive composition comprising:
   (a) 100 parts by weight of a block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks;
   (b) about 25 to about 200 parts by weight of a tackifying resin compatible with block B; and
   (c) about 1 to about 100 parts by weight of a di-to-tetra-functional acrylate or methacrylate selected from the group consisting of the acrylic and methacrylic acid esters of polyols.

2. A composition according to claim 1 wherein the weight ratio between the AB block copolymer and the multiblock copolymer is about 0:100 to about 90:10.

3. A composition according to claim 1 wherein said acrylate or methacrylate is selected from the group consisting of 1,6-hexane diol diacrylate, 1,6-hexane diol dimethacrylate, trimethylolpropane triacrylate, trimethylolpropane trimethacrylate, pentaerythritol tetracrylate, and pentaerythritol tetramethacrylate.

4. A composition according to claim 3 wherein said methacrylate is trimethylolpropane trimethacrylate.

5. A composition according to claim 1 wherein said multiblock copolymer is a selectively hydrogenated linear polystyrene-polybutadiene-polystyrene block copolymer.

6. A composition according to claim 5 wherein said A'B' block copolymer is a selectively hydrogenated polystyrene-polybutadiene block copolymer.

7. A composition according to claim 5 wherein said A'B' block copolymer is a selectively hydrogenated polystyrene-polyisoprene block copolymer.

8. A composition according to claim 1 wherein said multiblock copolymer is a selectively hydrogenated polystyrene-polyisoprene-polystyrene block copolymer.

9. A composition according to claim 1 wherein the amount of radiation employed is between about 1 and about 50 megarads.

10. A composition according to claim 3 wherein the amount of radiation employed is between about 2 and about 25 megarads.

11. A composition according to claim 1 wherein the amount of acrylate or methacrylate employed is between about 6 and about 25 parts by weight.

* * * * *